United States Patent
Ruge et al.

(10) Patent No.: US 10,358,299 B2
(45) Date of Patent: Jul. 23, 2019

(54) LOADING DEVICE

(71) Applicant: FERAG AG, Hinwil (CH)

(72) Inventors: Martin Ruge, Starrkirch-Wil (CH); Markus Felix, Richterswil (CH)

(73) Assignee: FERAG AG, Hinwil (CH)

(*) Notice: Subject to any disclaimer, the term of this patent is extended or adjusted under 35 U.S.C. 154(b) by 0 days.

(21) Appl. No.: 15/877,596

(22) Filed: Jan. 23, 2018

(65) Prior Publication Data
US 2018/0208407 A1 Jul. 26, 2018

(30) Foreign Application Priority Data

Jan. 26, 2017 (CH) .................................... 0085/17

(51) Int. Cl.

| B65G 47/61 | (2006.01) |
|---|---|
| B65G 17/20 | (2006.01) |
| B65G 9/00 | (2006.01) |
| B65G 19/02 | (2006.01) |
| B65G 29/02 | (2006.01) |
| B65G 47/84 | (2006.01) |

(52) U.S. Cl.
CPC .............. B65G 47/61 (2013.01); B65G 9/002 (2013.01); B65G 9/004 (2013.01); B65G 17/20 (2013.01); B65G 19/025 (2013.01); B65G 29/02 (2013.01); B65G 47/846 (2013.01); B65G 2201/0261 (2013.01)

(58) Field of Classification Search
CPC ........ B65G 9/002; B65G 9/004; B65G 17/20; B65G 19/025; B65G 29/02; B65G 47/57; B65G 47/61; B65G 47/842; B65G 47/847; B65G 2201/0238; B65G 47/846; B65G 2201/0261

See application file for complete search history.

(56) References Cited

U.S. PATENT DOCUMENTS

| 2,796,974 | A | * | 6/1957 | Weinberger | ............ | B65G 47/61 |
| | | | | | | 198/408 |
| 5,558,201 | A | * | 9/1996 | Oppliger | ................. | B07C 3/082 |
| | | | | | | 198/476.1 |
| 8,490,774 | B2 | * | 7/2013 | Janzen | ................. | B65G 19/025 |
| | | | | | | 198/384 |

(Continued)

FOREIGN PATENT DOCUMENTS

| DE | 101 10 787 A1 | 9/2002 |
| DE | 10 2008 061 685 A1 | 6/2010 |
| DE | 10 2009 013 434 A1 | 9/2010 |

(Continued)

Primary Examiner — Gene O Crawford
Assistant Examiner — Keith R Campbell
(74) Attorney, Agent, or Firm — Pauley Erickson & Kottis (57) ABSTRACT

A loading device (10) for continuously loading receiving units (4.1-4.8) with transport goods (T), wherein the loading device (10) comprises a plurality of receiving units (4.1-4.8), a conveyor device (2), in which the receiving units (4.1-4.8) can be conveyed, a supply device (3) for supplying transport goods (T) and a transfer device (1), which is designed to acquire the transport goods (T) from the supply device (3), as well as to convey and transfer the transport goods to the receiving units (4.1-4.8), wherein the transfer device (1) and the receiving units (4.1-4.8) can be moved in the same direction during the transfer of the transport goods (T).

27 Claims, 5 Drawing Sheets

(56) References Cited

U.S. PATENT DOCUMENTS

| | | | |
|---|---|---|---|
| 8,607,963 B2* | 12/2013 | Wend | B65G 47/61 |
| | | | 141/250 |
| 2017/0369250 A1* | 12/2017 | Fenile | B65G 17/20 |

FOREIGN PATENT DOCUMENTS

| | | |
|---|---|---|
| DE | 10 2009 026 043 A1 | 12/2010 |
| DE | 10 2012 018 925 A1 | 3/2014 |
| EP | 0 551 613 A1 | 7/1993 |
| EP | 0 638 501 A1 | 2/1995 |
| EP | 2 196 415 A2 | 6/2010 |

\* cited by examiner

Fig.5

LOADING DEVICE

CROSS-REFERENCE TO RELATED APPLICATIONS

Swiss Patent Applications 00085/17, filed 26 Jan. 2017, the priority document corresponding to this invention, to which a foreign priority benefit is claimed under Title 35, United States Code, Section 119, and their entire teachings are incorporated, by reference, into this specification.

BACKGROUND OF THE INVENTION

Field of the Invention

The present invention pertains to a loading device for continuously loading receiving units with transport goods, a conveyor system with a loading device and a method for operating a loading device.

Discussion of Related Art

Loading processes, in which receiving units such as bags are loaded with transport goods, play an important role in intra-logistics. Despite increasing automation, the transport goods typically are still manually loaded into the receiving units such that the loading capacities of the corresponding conveyor systems are very limited and high costs are accrued. Consequently, different loading solutions, in which the bags can be automatically loaded with transport goods, are known from the prior art.

An automatic loading station for bags conveyed in an overhead conveyor system is known from EP 2196415 A2. The loading station features an upper supply rail for the transport bags, a vertical conveyor, which follows the supply rail and serves for conveying the transport bags to a lower loading position, a device for opening the transport bags in the loading position and a lower discharge rail, which follows the vertical conveyor and serves for discharging the transport bags from the loading position. The supply rail leads into a rail from above via an upper supply deflection part and said rail is on its lower end connected to the discharge rail via a discharge deflection part. A load-stop unit with a piston-cylinder drive and a stopping bolt is arranged on the discharge deflection part. The load-stop unit serves for holding the transport bag in the loading position during the loading process and for once again releasing the transport bag after the loading process. Since the transport bags rest in the loading position during the loading process, the transport bags are loaded intermittently such that the loading capacity is reduced.

DE 102012018925 A1 describes an overhead bag conveyor system with an overhead conveyor for conveying bags downstream in a conveying direction along a guide rail, wherein the bags are suspended vertically underneath the guide rail in a conveying position, and wherein the bags are essentially aligned horizontally in a loading position. The overhead bag conveyor system comprises a loading station with a deflection device, wherein the deflection device has an upstream end and a downstream end and is arranged underneath the guide rail of the overhead conveyor. During their transport in the conveying direction, the bags come in contact with the deflection device in order to at least initially turn in the bags from the vertical conveying position into the essentially horizontal loading position during the further transport in the conveying direction. The bag comprises a suspension device for pivotably coupling the bag to the guide rail of the overhead conveyor, a rear side, which in the vertical conveying position features an upper section and a lower section, wherein the lower section follows the upper section in a longitudinal direction of the rear side, as well as a cover, a front side and a bottom. In the lateral direction, the rear side is respectively realized wider than the cover, the front side and the bottom such that the rear side features at least one wing area that laterally protrudes with respect to the front side, wherein said wing area strikes against the deflection device while the bag is conveyed through the loading station in order to turn the bag and rests on the deflection device in the loading position. The bags are particularly oriented parallel to a lateral direction, which extends transverse to the conveying direction, in the conveying position and in the loading position. Although loading and unloading processes can thereby be carried out while the transport motion resumes continuously, the loading station and the bags have a complicated design and the loading of the bags being conveyed through the loading station requires very precise timing.

SUMMARY OF THE INVENTION

Conveyor systems, in which receiving units are loaded with transport goods and conveyed, should have the highest possible conveying and loading capacities and at the same time a low error rate. In this context, the requirements with respect to the reliability of the loading processes and the flexibility in terms of the transport goods to be conveyed are of primary importance.

An objective of the invention can therefore be seen in making available a device and a method for loading receiving units with transport goods, which at least partially enhance the prior art.

This objective is attained with the features of the independent claims. Advantageous embodiments of the invention are disclosed in the dependent claims, as well as in the following description and the figures.

The invention particularly pertains to a loading device for continuously loading receiving units with transport goods. The loading device comprises a plurality of receiving units, a conveyor device, in which the receiving units can be conveyed, a supply device for supplying transport goods and a transfer device, which is designed to acquire the transport goods from the supply device, as well as to convey and transfer the transport goods to the receiving units, wherein the transfer device and the receiving units can be moved in the same direction during the transfer of the transport goods.

The receiving units to be loaded are typically conveyed to the transfer device by the conveyor device and then once again conveyed onward by the conveyor device after they have been loaded. The receiving units to be loaded may originate, for example, from a storage area or other areas of a conveyor system and be conveyed onward, for example, to processing stations after they have been loaded. The transfer device is advantageously arranged relative to the supply device and the conveyor device in such a way that the transfer device can serve as a link between the supply device, which supplies the transport goods, and the conveyor device, which conveys the receiving units. The loading device provides the advantage that the loading processes can take place continuously, i.e. without interrupting the transport motion of the receiving units.

Since the transfer device and the receiving units can be moved in the same direction, the time available for transferring the transport goods to the receiving units can be extended, wherein this is advantageous with respect to the reliability of the loading process. Furthermore, the identically directed motions of the transfer device and the receiving units make it possible that the transport motions of the receiving units can take place continuously during the loading process, as well as before and/or after the loading process, and that abrupt motion changes can be prevented.

In a preferred embodiment, the transfer device and the receiving units can be moved clock-synchronous during the transfer of the transport goods.

Since the transfer device and the receiving units can be moved clock-synchronous, the transport goods can be transferred to the receiving units in a clocked fashion such that the control over the loading processes and the transport of the loaded receiving units is improved. The clocked transfer of the transport goods to the receiving units provides the additional advantage that a certain tolerance with respect to the transfer time and the transfer site can be provided within a transfer clock without thereby causing errors during the transfer.

The transport goods may comprise consumer goods, piece goods, pre-commissioned packages, boxes or the like.

In a preferred embodiment, the loading device features a conveying section and a transfer section that at least partially overlap one another.

The transfer of the transport goods to the receiving units in a transfer section provides the advantage that the time available for the transfer can be extended and the transfer can take place in a controlled fashion. Due to the partial overlap of the transfer section with the conveying section, in which the receiving units are conveyed, a continuous transport of the receiving units can be ensured during and, in particular, before and/or after the loading process.

Before and/or during their transfer to the receiving units by the transfer device, the transport goods are preferably conveyed in the transfer section in such a way that the transport goods and the receiving units have a motion component that essentially extends in the same direction. In addition to the identically directed motion component, the transport goods may also have other superimposed motion components, particularly during the transfer to the receiving units. In transfer processes, in which the transport goods are dropped from the transfer device into the receiving units, for example, a vertical motion component caused by the gravitational force may be superimposed on the identically directed motion component of the transport goods.

In an embodiment, the conveyor device is realized discontinuous in the transfer section. Alternatively, the conveyor device may be realized continuous in the transfer section.

If the conveyor device is realized discontinuous in the transfer section, the receiving units can be conveyed by the transfer device in the transfer section, which at least partially overlaps with the conveying section. In this way, parts of the conveyor device can be advantageously prevented from obstructing the transfer of the transport goods to the receiving units in the transfer section. Greater flexibility with respect to the design and/or arrangement of the transfer device can thereby be achieved because it is not necessary to avoid parts of the conveyor device, which could form an obstruction in the transfer section.

If the conveyor device is realized continuous in the transfer section, it is advantageous that the receiving units are always conveyed by the conveyor device before, during and after the transfer of the transport goods to the receiving units such that a high continuity of the transport of the receiving units can be achieved.

In an embodiment with a continuous conveyor device, the clock-synchronous and/or identically directed motions of the transfer device and the receiving units in the transfer section are realized in that the transfer device features engaging elements, which can be functionally connected to the receiving units in the transfer section in such a way that the motions of the receiving units and the transfer device in the transfer section are synchronized. The functional connection between the engaging elements of the transfer device and the receiving unit can be produced due to the engagement of the engaging elements into driver elements of the receiving units. In embodiments, in which the receiving units are conveyed in the conveyor device by a conveying device such as a chain, the functional connection can be produced due to the engagement of the engaging elements into the conveying device.

In an embodiment, the conveying speed of the receiving units in the transfer section can be adapted to the conveying speed of the receiving units in the conveying section.

In this way, the continuity of the transport of the receiving units can be advantageously increased and abrupt deceleration or acceleration processes, which can lead to a higher error rate, can be reduced.

The extended time available for loading the receiving units, as well as the clocked loading thereof, provides the advantage that the conveying speed of the receiving units in the transfer section can also be adapted to higher conveying speeds of the receiving units in the conveying section without thereby affecting the reliability of the loading process.

In an embodiment, the transfer device is designed to acquire receiving units from the conveyor device, to convey the receiving units clock-synchronous with the transport goods in the transfer device and to load the receiving units with the transport goods, as well as to transfer the loaded receiving units to the conveyor device.

The transport in the transfer device has the advantageous effect that the transfer can be better controlled, among other things, because more time is available for the transfer. The time available for the transfer can be controlled with the specific design of the transfer device, e.g. with the shape or the conveying speed of the transfer device, such that the control over the loading process is improved. Due to the transport of the receiving units in the transfer device, the transfer of the transport goods to the receiving units can take place in the transfer device. In this way, the error rate during the loading process is advantageously reduced in comparison with solutions known from the prior art, in which the transfer of the transport goods to the receiving unit takes place between different conveyor devices of a conveyor system.

In an embodiment, the receiving units respectively feature a transport unit and at least one bag for accommodating transport goods, which are permanently connected to one another, wherein the transport units can be conveyed in the conveyor device and/or the transfer device. Alternatively or additionally, the receiving units may respectively feature a transport unit and at least one bag for accommodating transport goods, which are releasably connected to one another, wherein the transport units can be conveyed in the conveyor device and/or the transfer device.

In the context of the present invention, the term "bag" may include any receptacles for accommodating and conveying transport goods such as pouches, sacks, cartons, boxes, baskets or the like.

The transport units may comprise carriages, disks, hooks, brackets, roller arrangements or the like.

In an embodiment, in which the transport units and the bags are releasably connected to one another, the transfer device respectively acquires the bags that are conveyed and loaded in the transfer device. The associated transport units of the receiving units, which have delivered the bags to the transfer device, can be conveyed onward and then once again receive the loaded bags from the transfer device. The transport units may optionally be discharged from the conveyor device after the delivery of the bags, if the bags exit the transfer device after the loading process and no longer have to be conveyed onward or if the bags are acquired by other transport units.

In a further embodiment, the receiving units themselves are realized in the form of bags that are conveyed, e.g., by a conveyor belt.

In an embodiment, the conveyor device is an overhead conveyor device with a track rail, wherein the transport units consist of carriages that can be conveyed along the track rail at variable distances from one another.

The track rail may be realized discontinuous or continuous in the transfer section. If the track rail is realized discontinuous in the transfer section, the track rail may be arranged at different heights upstream and downstream of the transfer section, particularly if the transfer device enables the receiving units to overcome a height difference in the transfer section.

In an embodiment, the loading device features aligning element designed to align the orientation of the bags before and/or during and/or after the transfer of the transport goods to the bags.

The aligning elements may be arranged on the conveyor device or on the transfer device. In a variation, the aligning elements may be arranged on the receiving units, e.g. on the transport units if the receiving units are provided with transport units. The aligning elements may align the orientation of the bags mechanically or magnetically. Before the transfer of the transport goods takes place, the aligning elements preferably align the orientation of the bags in such a way that the bags can securely receive the transport goods. For example, the bags can be aligned from a transverse orientation referred to the conveying section to a longitudinal orientation if the transport goods are delivered in a longitudinally oriented fashion by the transfer device. However, it may be advantageous to convey the bags in a transversely oriented fashion referred to the conveying section upstream and/or downstream of the transfer device because the bags thereby occupy less space along the conveying section. When processing cuboid transport goods, the supply device preferably supplies the transport goods such that they stand on one longitudinal side for a longitudinally oriented transport and such that they lie horizontally for a transversely oriented transport.

In an embodiment, the transfer device features engaging elements that can be functionally connected to the receiving units.

Due to these engaging elements, the motions of the receiving units and the transfer device can be synchronized and/or take place in the same direction. The functional connection between the engaging elements of the transfer device and the receiving units may be produced due to the engagement of the engaging elements into driver elements of the receiving units. If the receiving units are provided with transport units, the driver elements are preferably arranged on the transport units. The driver elements and/or the engaging elements may comprise pins, hooks, recesses, etc. The functional connection between the engaging elements and the receiving units may be realized mechanically or magnetically.

The receiving units can be acquired and conveyed by the transfer device due to the engagement of the engaging elements into driver elements of the receiving units. Alternatively, the receiving units may also be conveyed onward in the conveying device after the engagement of the engaging elements into the driver elements, wherein the motion of the receiving units and the motion of the transfer device are synchronized and/or take place in the same direction due to the engagement of the engaging elements.

In embodiments, in which the receiving units are conveyed in the conveyor device by a conveying device such as a chain, the functional connection can be produced due to the engagement of the engaging elements into the conveying device.

In an embodiment, the transfer device features transfer compartments for accommodating the transport goods.

The supply device is preferably arranged relative to the transfer device in such a way that the transport goods can be delivered into the transfer compartments. The transfer compartments preferably have openings that are open toward the supply device during the transfer of the transport goods. In an embodiment, the supply device comprises a conveyor belt, on which the transport goods can be conveyed. At the transfer device, the conveyor belt may feature an inclined section, from which the transport goods can drop into the transfer compartments of the transfer device due to the gravitational force. The transfer compartments may respectively accommodate one of the transport goods or multiple transport goods, if so required.

The transfer device and the receiving units preferably can be moved in the same direction in such a way that the transfer compartments and the receiving units are moved in the same direction during the transfer of the transport goods to the receiving units.

In an embodiment, the transfer compartments feature guiding elements designed to guide the transport goods.

The guiding elements provide the advantage that the transport goods can be delivered to the receiving units in a guided fashion. The guiding elements may furthermore serve for guiding the transport goods during their acquisition from the supply device.

The guiding elements are preferably realized in the form of movable walls. The walls may be fixed in the transfer device on one end and realized pivotable on their free end. Alternatively or additionally, the walls may also be realized in a displaceable or rotatable fashion. The walls may therefore serve as a support surface for the transport goods, as well as a guide surface. The motions of the walls may be controlled with the aid of a control unit.

In an embodiment, the walls of the transfer compartments are realized in the form of double walls, wherein one of the walls is respectively movable, particularly pivotable, and the other wall is fixed.

In an embodiment, the transfer compartments feature stopping elements that can be moved between a closed position and an open position and hold the transport goods in the respective transfer compartment in the closed position, wherein the stopping elements are preferably controllable.

The stopping elements are preferably realized in the form of pivotable flaps. In an embodiment, the flaps are arranged on the walls of the transfer compartments.

The stopping elements may preferably be realized in such a way that they can be opened and/or closed with the aid of a control unit. Alternatively or additionally, the stopping elements may be mechanically realized in such a way that they can be opened and/or closed in a position-dependent and/or load-dependent fashion, e.g. with the aid of a separable snap-in mechanism.

In an embodiment, the stopping elements form in the open position a guide for the acquisition of the transport goods from the supply device and/or for the transfer of the transport goods to the receiving units.

This provides the advantage of an improved guidance of the transport goods during their acquisition and/or transfer such that the error rate can be reduced. In embodiments, in which the stopping elements are realized in the form of pivotable flaps, the flaps may in the open position form an extension of the walls of the transfer compartments and thereby guide the transport goods.

The stopping elements may optionally form a guide for the receiving units during the acquisition of the receiving units from the conveyor device and/or during the transfer of the receiving units to the conveyor device.

In an embodiment, the stopping elements are designed to open and/or hold open a receiving opening of a receiving unit to be loaded during their motion from the closed position into the open position.

The stopping elements preferably can be moved from the closed position into the open position shortly before the transfer of the transport goods to the receiving units.

This provides the advantage that a motion of the stopping elements into the open position makes it possible to uncover the transfer compartment with the transport goods to be transferred, as well as to open a receiving opening of a receiving unit to be loaded. The receiving opening of the receiving unit can be held open during the transfer of the transport goods such that a reliable transfer of the transport goods can take place.

In embodiments, in which the receiving unit comprises a transport unit and a bag, the bag features a corresponding receiving opening.

In an embodiment, the bag features a pivotable frame device that can be pivoted in order to thereby respectively open and close the receiving opening of the bag. Optionally, the stopping elements may in such embodiments be functionally connectable to the frame device in such a way that the frame device is pivoted by the stopping elements in order to thereby respectively open and/or hold open and close the receiving opening of the bag.

In an embodiment, the transfer device is realized in an endlessly revolving fashion. The transfer device preferably features a wheel for conveying transport goods and/or receiving units.

In this case, the transfer device preferably revolves in such a way that the transfer device and the receiving units move in the same direction in the transfer section.

The wheel is preferably arranged vertically in a plane like the conveying section and can convey the transport goods and/or receiving units due to its rotation.

The wheel preferably features radially oriented transfer compartments. The transfer compartments may have movable and/or fixed walls, which are respectively mounted on a hinge point toward the center of the wheel, wherein the movable walls can preferably be pivoted about this hinge point. Alternatively or additionally, the movable walls may be realized in a displaceable or rotatable fashion. The walls may serve as a support surface for the transport goods and/or as a guide surface.

The motion of the walls may be controlled with the aid of a control unit. The wheel preferably comprises a lateral disk that defines the transfer compartments transverse to the conveying section. The lateral disk may advantageously provide a guide for the transport goods.

In an embodiment with a lateral disk, the wheel is arranged in an inclined fashion. This provides the advantage that the lateral disk can in addition to the walls form another support surface for the transport goods and serve as a guide surface during the transfer of the transport goods.

The wheel provides the advantage that the transport goods are held in the transfer compartments due to the gravitational force in the upper half of the wheel and drop out of the transfer compartments due to the gravitational force in the lower half of the wheel in order to thereby be transferred into the receiving units to be loaded.

The transfer compartments preferably feature stopping elements that are pivotably arranged on the walls of the transfer compartments on the edge of the wheel.

In order to prevent the transport goods from prematurely dropping out of the transfer compartments, the stopping elements can hold the transport goods in the transfer compartments in the closed position. The wheel preferably features engaging elements that are arranged on the edge of the wheel and can be functionally connected to receiving units.

The motion of the wheel can be synchronized with the motion of the receiving units due to the functional connection between the engaging elements and the receiving units. One engaging elements is preferably provided for each transfer compartment such that one receiving unit to be loaded is conveyed along per transfer compartment and a clocked loading process can thereby be realized. The transfer section is preferably defined by the part of the circumference of the wheel that overlaps with the conveying section such that its length can be advantageously modified by varying the size of the wheel.

The supply device is preferably arranged on the upper region of the wheel and transfers the transport goods to the transfer compartments of the wheel due to the gravitational force. The rotation of the wheel makes it possible to convey the transport goods into the lower region of the wheel, where they are transferred to the receiving units to be loaded due to the gravitational force and preferably by opening the stopping elements. Due to the rotation of the wheel, the loaded receiving units can be conveyed onward with the aid of the engaging elements, wherein the loaded receiving units can be once again transferred to the conveyor device in embodiments, in which the receiving units are conveyed by the transfer device.

In an embodiment, the transfer device features a second wheel that is arranged downstream. The second wheel preferably features engaging elements that can be functionally connected to the receiving units. The second wheel may advantageously serve for loading the loaded receiving units with additional transport goods. The two wheels may be arranged in separate transfer devices with separate transport goods to be transferred or in a common transfer device, e.g. due to a connection by means of a chain or belt. The second wheel provides the advantage that the transfer section and therefore the time available for the transfer can be extended. The transfer device may optionally comprise additional wheels.

In an embodiment, the transfer device comprises a carousel. The carousel preferably comprises two deflection rollers and an upper run, as well as a lower run. The carousel preferably comprises transfer compartments, in which the transport goods can be conveyed. The carousel preferably acquires the transport goods from the supply device upstream of or by the upper run and transfers the transport goods to the receiving units upstream of or by the lower run. The transfer section can be advantageously extended due to the design of the transfer device with a carousel such that the time available for transferring the transport goods to the receiving units is also extended accordingly.

In an embodiment, the loading device features opening devices that are designed to open and/or hold open a receiving opening of a receiving unit to be loaded.

The opening devices may be arranged on the conveyor device or on the transfer device. Alternatively or additionally, the opening devices may be arranged on the receiving units. In embodiments, in which the receiving units feature bags, the opening devices may be arranged on the bags. The receiving openings of the receiving units can thereby be held open during the transfer of the transport goods such that a reliable transfer of the transport goods can take place.

In an embodiment, the opening devices may respectively comprise a pivotable frame device that is arranged on the bags and can be pivoted in order to thereby respectively open and/or hold open and close the receiving opening of the bag.

The invention also pertains to a conveyor system with a loading device according to the present description.

The conveyor device can acquire and/or transfer the receiving units from/to other conveyor devices or processing stations of the conveyor system.

In an embodiment, the conveyor system features a control unit that controls the transfer of the transport goods to the receiving units.

The invention furthermore pertains to a method for operating a loading device according to the preceding description, wherein said method comprises the steps of: i) supplying transport goods by means of the supply device; ii) acquiring the transport goods by means of the transfer device; iii) conveying the transport goods in the transfer device; iv) supplying receiving units to be loaded by means of the conveyor device; v) transferring the transport goods to the receiving units while the transfer device and the receiving units move in the same direction.

The method provides the advantage that the loading processes can take place continuously, i.e. without interrupting the transport motion of the receiving units. Due to the identically directed motions of the transfer device and the receiving units, the time available for the transfer of the transport goods to the receiving units can be extended such that the reliability of the loading process can be advantageously improved. Furthermore, the identically directed motions of the transfer device and the receiving units make it possible that the transport motions of the receiving units can take place continuously during the loading process, as well as before and/or after the loading process, and that abrupt motion changes can be prevented.

In an embodiment of the method, the transfer device and the receiving units move clock-synchronous during the transfer of the transport goods to the receiving units.

In embodiments with transfer compartments, the transfer device and the receiving units preferably move in such a way that the transfer compartments and the receiving units move clock-synchronous during the transfer of the transport goods to the receiving units.

Due to the clock-synchronous motions of the transfer device and the receiving units, the transport goods can be transferred to the receiving units in a clocked fashion such that the control over the loading processes and the transport of the loaded receiving units is improved.

In an embodiment of the method, the transfer device acquires the receiving units to be loaded from the conveyor device, conveys the receiving units in the transfer device clock-synchronous with the transport goods, loads these receiving units with the transport goods and transfers the loaded receiving units to the conveyor device.

In an embodiment of the method, the receiving units are conveyed in a conveying section and loaded with transport goods in a transfer section, wherein the conveying section and the transfer section at least partially overlap.

In an embodiment of the method, the conveying speed of the receiving units in the transfer section is adapted to the conveying speed of the receiving units in the conveying section.

BRIEF DESCRIPTION OF SEVERAL VIEWS OF THE DRAWINGS

Embodiments of the invention are elucidated with reference to the following schematic figures and the associated description. In these figures.

DESCRIPTION OF PREFERRED EMBODIMENTS

Preferred embodiments are described in greater detail below with reference to the figures in order to visualize the invention.

Figure 1:
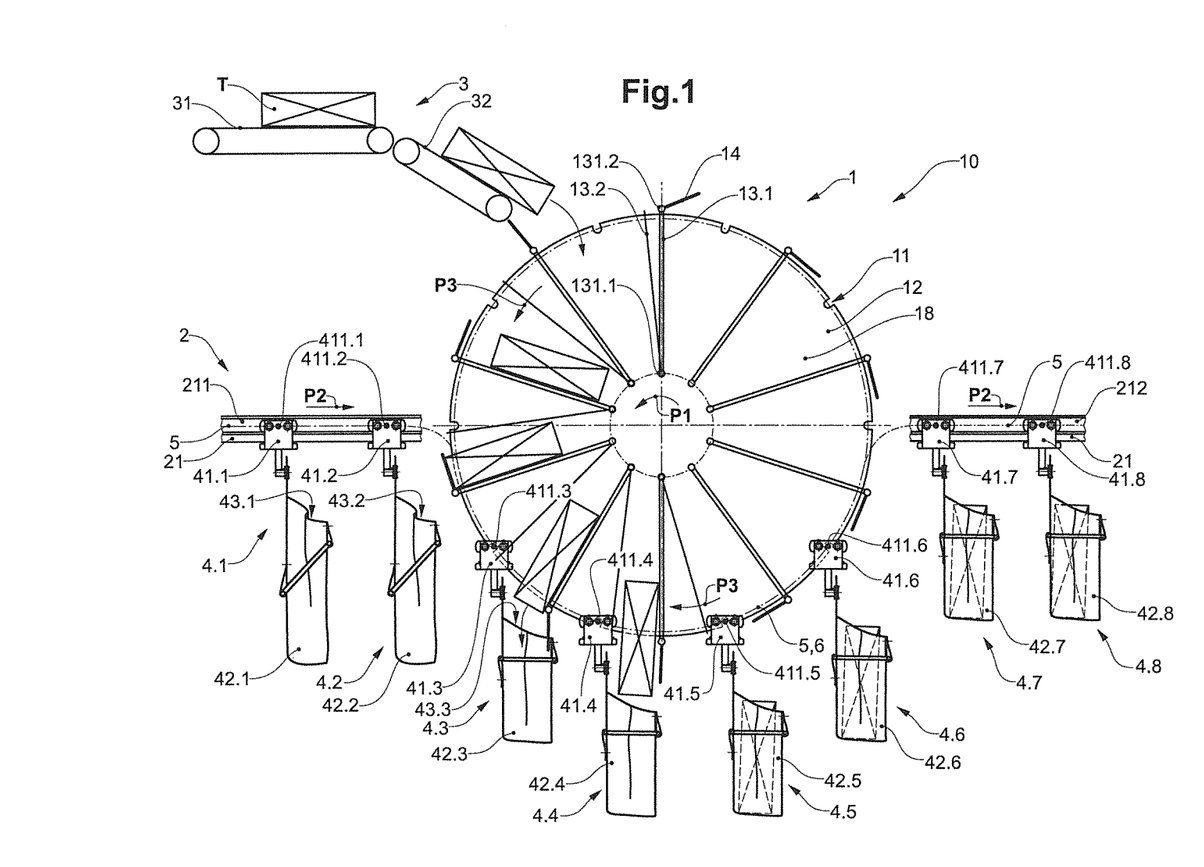
FIG. 1 shows a side view of a first embodiment of a loading device.

FIG. 1 shows a schematic side view of a first embodiment of a loading device 10 that comprises a transfer device with a wheel 1, an overhead conveyor device 2 and a supply device 3. The wheel 1 is realized in an endlessly revolving fashion (arrow P1), e.g. rotatably, and features transfer compartments 12 that can accommodate transport goods T. The supply device 3 comprises conveyor belts 31, 32, on which the transport goods T are supplied to the wheel 1. The transport goods T drop into the transfer compartments 12 of the wheel 1 from the inclined conveyor belt 32 due to the gravitational force. The wheel features a lateral disk 18 that is arranged vertically and defines the transfer compartments 12 transverse to the rotating direction (arrow P1). The overhead conveyor device 2 comprises a track rail 21. The supply device 3 is arranged relative to the wheel 1 in such a way that the transport goods T are supplied in the same direction as receiving units 4.1-4.8.

FIG. 1 shows receiving units 4.1-4.8 that respectively feature carriages 41.1-41.8 and bags 42.1-42.8, which are permanently connected to one another. The bags 42.1-42.8 have receiving openings 43.1, 43.2, 43.3, . . . and are designed for accommodating transport goods T. The carriages 41.1-41.8 can be conveyed along the track rail 21 in the direction of the arrow P2 at variable distances from one another. The loading device 10 features a conveying section 5, in which the receiving units 4.1-4.8 can be conveyed, as well as a transfer section 6 that overlaps with the conveying section 5. The bags 42.1-42.8 are conveyed in a transversely oriented fashion referred to the conveying section 5, i.e. the bags 42.1-42.8 have their greatest horizontal extent transverse to the conveying section 5. The transfer section 6 is formed in the lower region of the wheel 1 by an edge section of the wheel 1. In the transfer section 6, the receiving units are conveyed by the wheel 1 and loaded with the transport goods T. The wheel 1 then once again transfers the loaded receiving units from the transfer section 6 to the conveying section 5, from where the loaded receiving units are conveyed onward.

The transfer compartments 12 are defined by first walls 13.1. The transfer compartments 12 feature second walls 13.2 that are movably arranged on the wheel 1. The second walls 13.2 may respectively adjoin a first wall 13.1 such that both walls jointly form a double wall. The second walls 13.2 respectively are pivotably mounted about the hinge points 131.1 within the transfer compartments 12 and can be pivoted as indicated by the arrows P3 in order to guide the transport goods T in the transfer compartments 12. The first walls 13.1 are fixed and serve as a support surface for the transport goods T in the transfer compartments 12. Stopping elements in the form of pivotable flaps 14 are mounted on end hinge points 131.2 of the first walls 13.1. The flaps 14 can be pivoted between a closed position, in which the flaps 14 hold the transport goods T in the transfer compartments 12, and an open position. In the open position, the flaps 14 can serve as a guide for the transport goods T that drop into the transfer compartments 12 from the conveyor belt 32. The flaps 14 pivot into the closed position after the transport goods T have been acquired from the supply device 3 such that the transport goods T are held in the transfer compartments 12. Shortly before the transfer of the transport goods T from the transfer compartments 12 of the wheel 1 to the receiving units, the flaps 14 pivot into the open position in order to thereby release the transport goods T. The flaps 14 hold open the receiving openings of the receiving units during the transfer of the transport goods T to the receiving units as indicated by the receiving unit 4.3 and the receiving opening 43.3 of the bag 42.3 in FIG. 1. The pivotable second walls 13.2 particularly serve as a guide during the transfer of the transport goods T to the receiving units as indicated by the transfer into the receiving units 4.3, 4.4 in FIG. 1.

The wheel 1 features engaging elements, which are realized in the form of recesses 11 on the peripheral edge, for each transfer compartment 12, wherein said engaging elements can engage into driving elements 411.1-411.8 of the transport units 41.1-41.8. Due to the engagement of the recesses 11 into the driver elements 411.1-411.8, the receiving units can be conveyed by the wheel 1 in the transfer section 6 as indicated by the receiving units 4.3-4.6 in FIG. 1. The track rail 21 of the overhead conveyor device 2 is realized discontinuous in the transfer section 6 such that a first track rail section 211 is arranged upstream of the transfer section 6 and a second track rail section 212 is arranged downstream of the transfer section 6. The transport units with the receiving units to be loaded are supplied to the wheel 1 on the first track rail section 211 and transferred to the wheel 1. The transport units with the loaded receiving units are then transferred from the wheel 1 to the second track rail section 212 and conveyed onward. In FIG. 1, the transport units 411.1 and 411.2 of the receiving units 4.1 and 4.2 are located in the first track rail section 211 and the transport units 411.7 and 411.8 of the receiving units 4.7 and 4.8 are located in the second track rail section 212. The first and second track rail sections 211 and 212 are arranged at the same height.

According to FIG. 1, the rotating wheel 1 or the transfer compartments 12 and the receiving units move in the same direction and clock-synchronous in the transfer section 6 such that a reliable and continuous transfer of the transport goods T into the bags of the receiving units is achieved.

Figure 2:
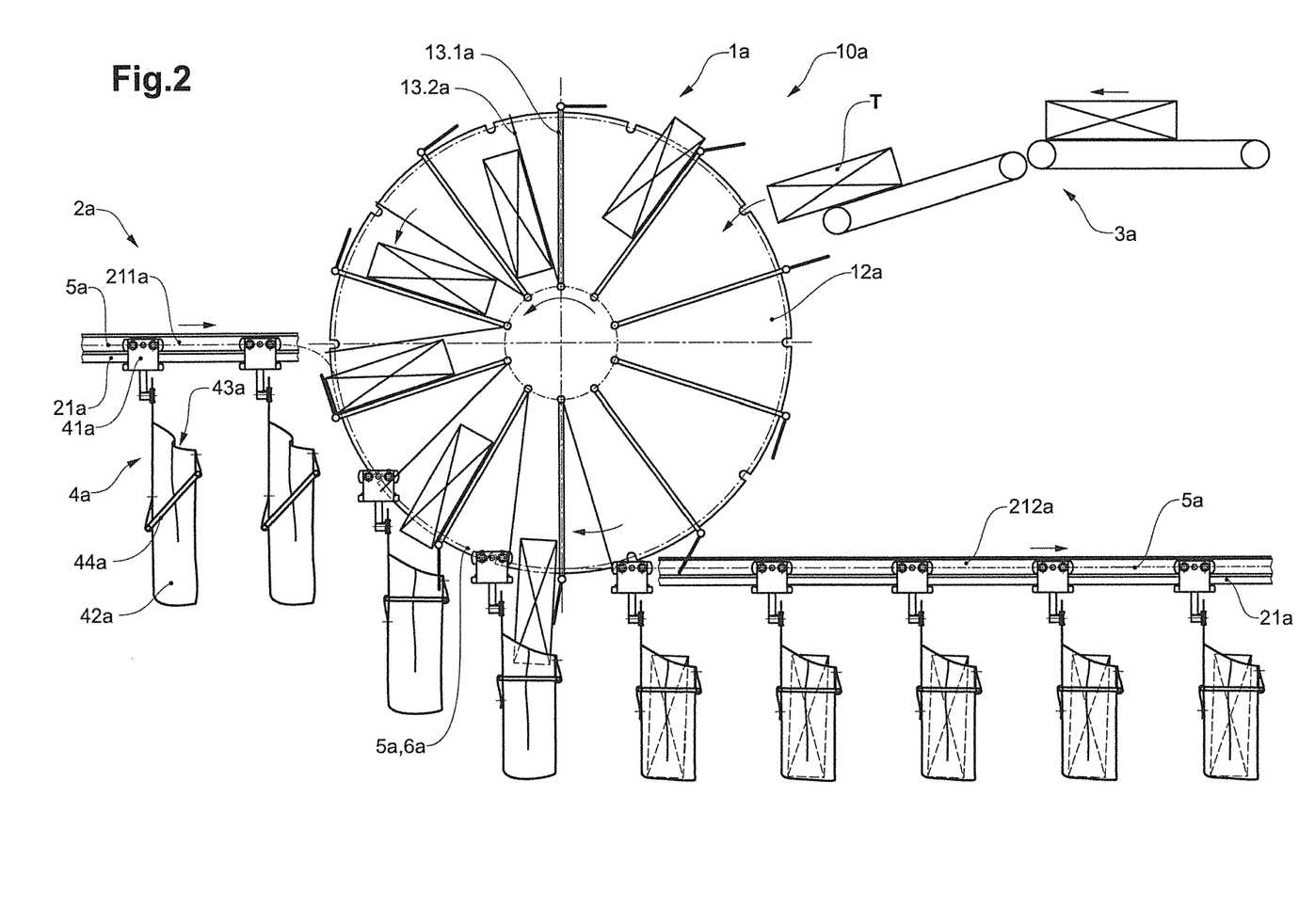
FIG. 2 shows a side view of a second embodiment of a loading device.

FIG. 2 shows a schematic side view of a second embodiment of a loading device 10a that comprises a transfer device with a wheel 1a, an overhead conveyor device 2a and a supply device 3a. The overhead conveyor device 2a comprises a track rail 21a. The receiving units 4a (only one of which is provided with reference symbols in FIG. 2 for reasons of simplicity) respectively feature carriages 41a and bags 42a, which are permanently connected to one another. The bags 42a have receiving openings 43a and are designed for accommodating transport goods T. Pivotable frame devices 44a are arranged on the bags 42a and make it possible to close, open and hold open the receiving openings 43a. The carriages 41a can be conveyed along the track rail 21a at variable distances from one another. The loading device 10a features a conveying section 5a, in which the receiving units 4a can be conveyed, as well as a transfer section 6a that overlaps with the conveying section 5a. The transfer section 6a is formed in the lower region of the wheel 1a by an edge section. In the transfer section 6a, the receiving units 4a are conveyed by the wheel 1a and loaded with the transport goods T. The wheel 1a then once again transfers the loaded receiving units from the transfer section 6a to the conveying section 5a, from where the loaded receiving units 4 are conveyed onward.

The track rail 21a of the overhead conveyor device 2a is realized discontinuous in the transfer section 6a such that a first track rail section 211a is arranged upstream of the transfer section 6a and a second track rail section 212a is arranged downstream of the transfer section 6a. The first track rail section 211a and the second track rail section 212a are arranged at different heights, wherein the height difference between the first and the second track rail sections 211a and 212a is overcome by the wheel 1a.

The supply device 3a is arranged relative to the wheel 1a in such a way that the transport goods T are supplied in the opposite direction of the receiving units 4a.

The wheel 1a features transfer compartments 12a that are defined by first walls 13.1a. The transfer compartments 12a feature second walls 13.2a that can be moved relative to the wheel 1a. The second walls 13.2a are respectively realized pivotable within the transfer compartments 12a and serve as a guide during the transfer of the transport goods T to the receiving units 4a. The first walls 13.1a are respectively fixed. The second walls 13.2a may respectively adjoin a first wall 13.1a such that both walls jointly form a double wall. During the acquisition of the transport goods T from the supply device 3a, the second walls 13.2a respectively adjoin the first walls 13.1a such that the transport goods T respectively come to lie on second walls 13.2a. A rotation of the wheel 1a causes the second walls 13.2a to respectively pivot away from the first walls 13.1a, which they adjoin, such that the (respectively opposite) first walls 13.1a serve as a support surface for the transport goods T until they are transferred to the receiving units 4a.

The rotating wheel 1a and the receiving units 4a move in the same direction and clock-synchronous in the transfer section 6 such that a reliable and continuous transfer of the transport goods T into the bags 42a of the receiving units 4a is achieved.

Figure 3:
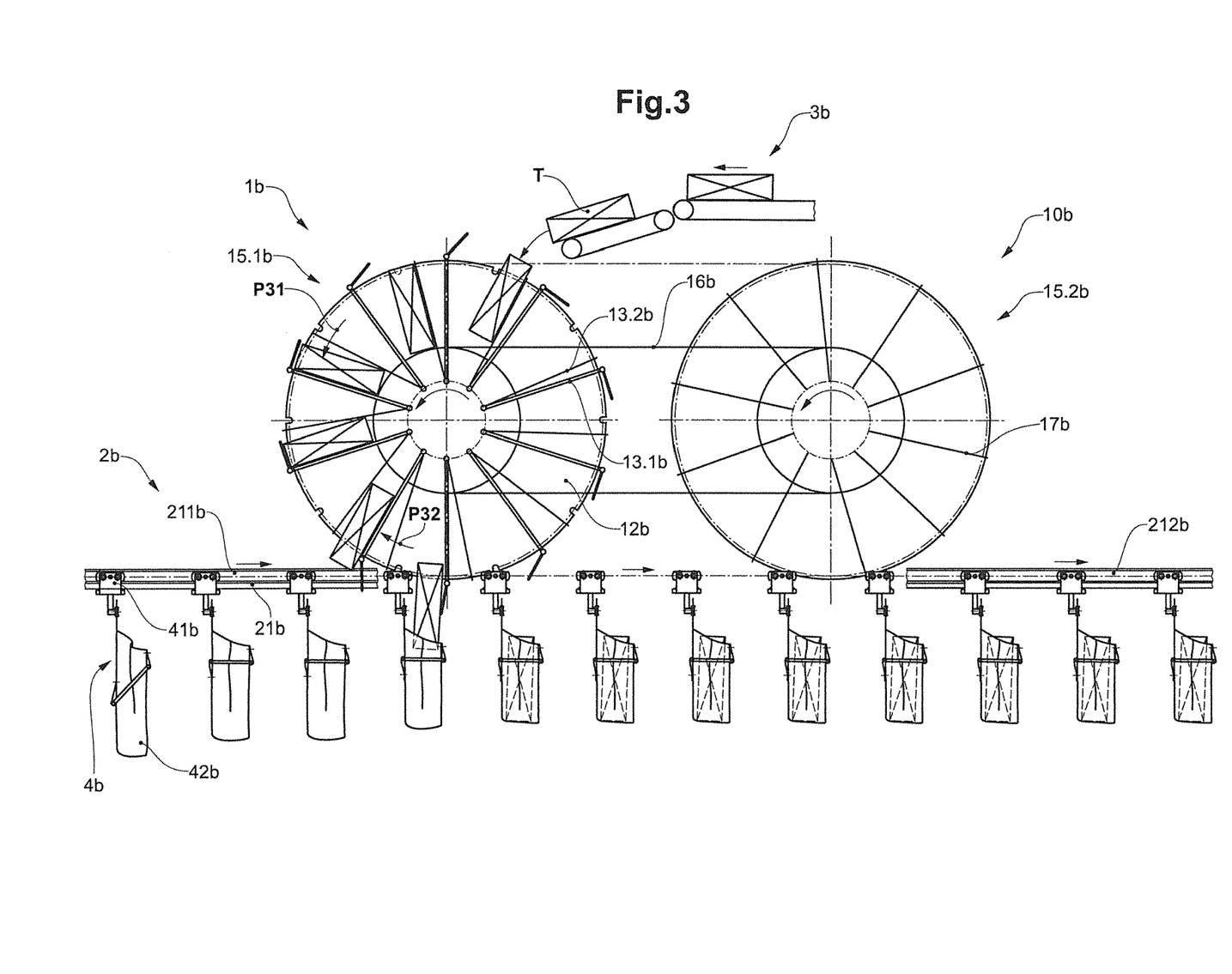
FIG. 3 shows a side view of a third embodiment of a loading device.

FIG. 3 shows a schematic side view of a third embodiment of a loading device 10b that comprises a transfer device 1b, an overhead conveyor device 2b and a supply device 3b. The overhead conveyor device 2b comprises a discontinuous track rail 21b with a first track rail section 211b and a second track rail section 212b. The transfer device 1b comprises a first wheel 15.1b and a second wheel 15.2b. The two wheels 15.1b and 15.2b are functionally connected by means of a belt 16b and can be synchronously rotated thereby. The supply device 3b supplies transport goods T to the first wheel 15.1b, which transfers the transport goods T to the receiving units 4b. The receiving units 4b respectively comprise a bag 42b and a transport unit, which is realized in the form of a carriage 41b that can be conveyed along the track rail 21b. The first wheel 15.1b features transfer compartments 12b that are defined by first walls 13.1b. The first wheel 15.1b features second walls 13.1b that can be moved relative to the first wheel 15.1b. The second walls 13.2b are respectively realized pivotable within the transfer compartments 12b and form a guide during the transfer of the transport goods T to the receiving units 4b. During the acquisition of the transport goods T from the supply device 3b, the transport goods T respectively come to lie on second walls 13.2b. A rotation of the wheel 15.1b causes the second walls 13.2b to pivot such that the transport goods T come to rest on the fixed first walls 13.1b. In this case, the second walls 13.2b pivot so far in the direction of the arrow P31 that they come to lie on the transport goods T and clamp these transport goods in their position in the transfer compartments 12b. The second walls 13.2b are mounted in such a way that they pivot in the direction of the arrow P32 shortly before the transfer of the transport goods T to the receiving units 4b in order to thereby release the transport goods T.

The second wheel 15.2b features spokes 17b that can be functionally connected to the track carriages 41b of the receiving units 4b and transfer the track carriages 41b to the second track rail section 212b arranged downstream. Although not illustrated in FIG. 3, the second wheel 15.2b can be used for transferring additional transport goods T into the receiving units 4b, which were loaded by the first wheel 15.1b, analogous to the first wheel 15.1b.

The transport of the receiving units 4b between the wheels 15.1b and 15.2b is only indicated schematically in FIG. 3. The transport of the receiving units 4b between the wheels 15.1b and 15.2b may be realized, e.g., with the aid of suitable a conveying device such as a chain.

Figure 4:
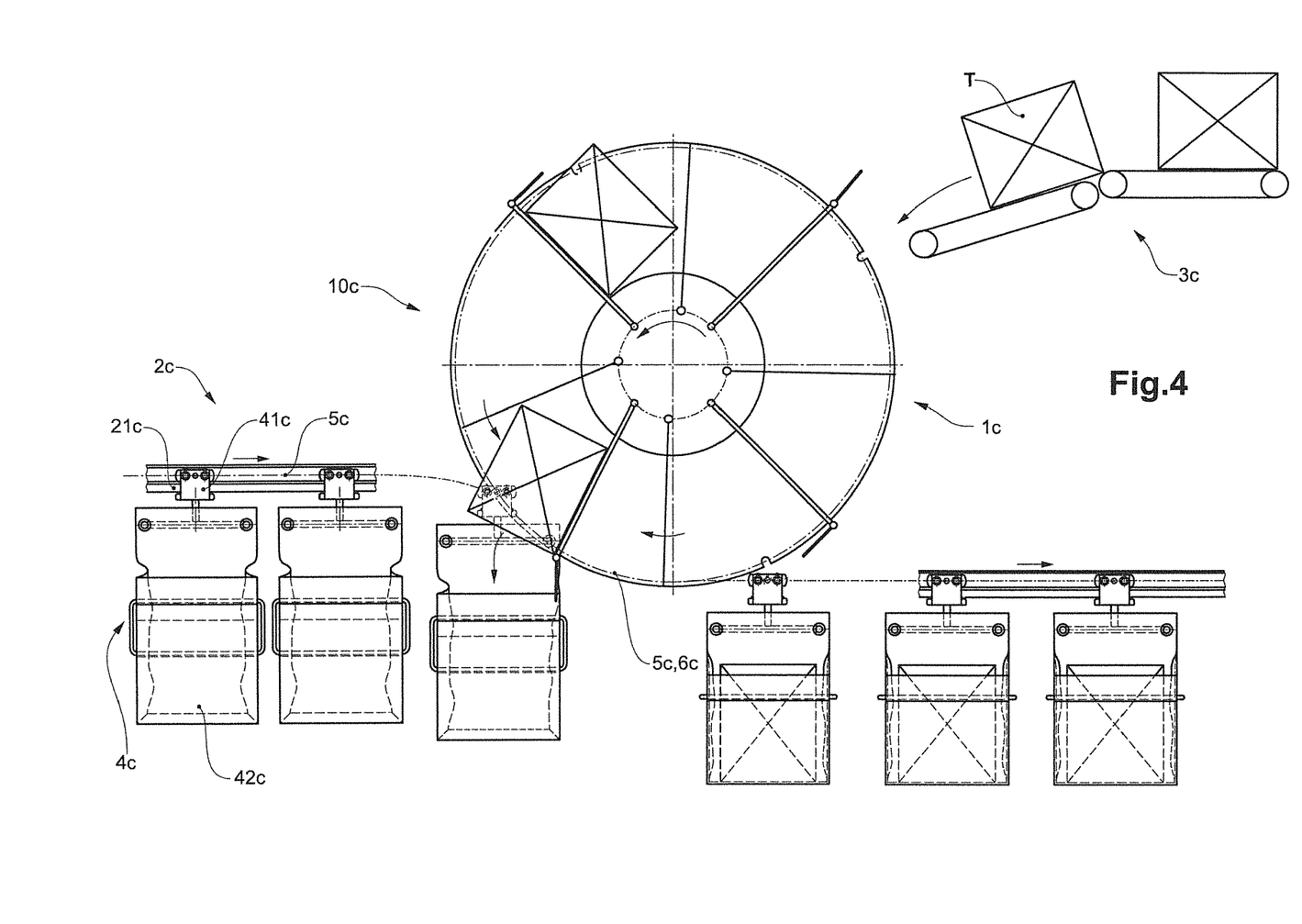
FIG. 4 shows a side view of a fourth embodiment of a loading device.

FIG. 4 shows a schematic side view of a fourth embodiment of a loading device 10c that comprises a supply device 3c, an overhead conveyor device 2c and a transfer device with a wheel 1c. The overhead conveyor device 2c comprises a track rail 21c. The loading device 10c features receiving units 4c that respectively comprise a bag 42c and a transport unit in the form of a carriage 41c. The carriages 41c can be conveyed along the track rail 21c at variable distances from one another. The bags 42c are conveyed in a longitudinally oriented fashion referred to the conveying section 5c and the transfer section 6c, i.e. the bags 42c have their greatest horizontal extent along the conveying section 5c and the transfer section 6c. The transport goods T are accordingly supplied on the supply device 3c, as well as conveyed in the wheel 1c, in a longitudinally oriented fashion. The track rail 21c is realized continuous in the transfer section 5c although this part of the track rail 21c is drawn with broken lines in FIG. 5 in order to provide a better overview. Due to the longitudinally oriented transfer of the transport goods T to the bags 42c, the track rail 21c can be realized continuous in the transfer section 5c without thereby obstructing the transfer of the transport goods T to the bags 42c.

Figure 5:
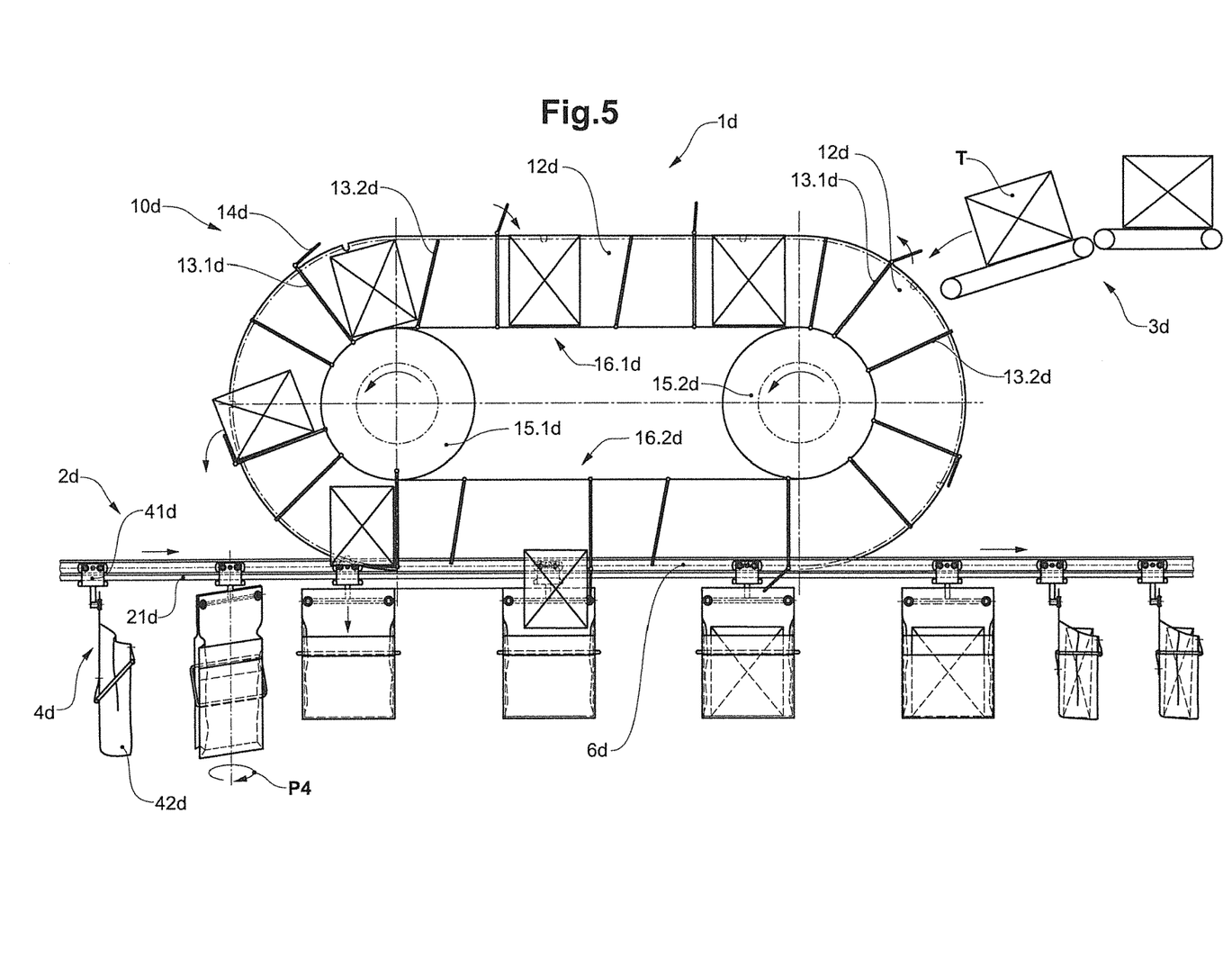
FIG. 5 shows a side view of a fifth embodiment of a loading device.

FIG. 5 shows a schematic side view of a fifth embodiment of a loading device 10d that comprises a supply device 3d, an overhead conveyor device 2d and a transfer device 1d. The overhead conveyor device 2d comprises a track rail 21d. The transfer device comprises a carousel 1d with an upper run 16.1d and a lower run 16.2d. The carousel 1d features a first deflection roller 15.1d and a second deflection roller 15.2d. The supply device 3d supplies transport goods T that are acquired by the carousel 1d upstream of the upper run 16.1c1 and conveyed from the upper run 16.1d to the lower run 16.2d. The transport goods T are then transferred from the lower run 16.2d to the receiving units 4d. The carousel 1d features transfer compartments 12d that are defined by first and second walls 13.1c1 and 13.2d, wherein the transport goods T can be accommodated in said transfer compartments. Flaps 14d, which can be pivoted between an open and a closed position, are arranged on the first walls 13.1d and can hold the transport goods T in the transfer compartments 12d in the closed position.

The receiving units 4d respectively comprise a bag 42d and a transport unit, which is realized in the form of a carriage 41d that can be conveyed along the track rail 21d. Aligning elements (which are not illustrated in FIG. 5) are arranged on the carriages 41d and change the orientation of the bags 42d from a transverse orientation to a longitudinal orientation (arrow P4) shortly before the transfer of the transport goods T. The transport goods T are supplied by the supply device 3d, as well as conveyed and transferred to the bags 42d by the carousel 1d, in a longitudinally oriented fashion. After the transfer of the transport goods T, the orientation of the bags 42d is once again changed from the longitudinal orientation to the transverse orientation by the aligning elements.

The track rail 21d is realized continuous in the transfer section 6d. Due to the longitudinally oriented transfer of the transport goods T to the bags 42d, the track rail 21d can be realized continuous in the transfer section 6d without the track rail 21d thereby obstructing the transfer of the transport goods T to the bags 42d.

It is claimed:

1. A loading device (10, 10a-d) for continuously loading receiving units (4.1-4.8, 4a-d) with transport goods (T) comprising:
   a plurality of receiving units (4.1-4.8, 4a-d);
   a conveyor device (2, 2a-d), in which the receiving units (4.1-4.8, 4a-d) are conveyed;
   a supply conveyor (3, 3a-d) for supplying transport goods (T); and
   a transfer device (1, 1a-d) to acquire the transport goods (T) from the supply conveyor (3, 3a-d), as well as convey and transfer the transport goods to the receiving units (4.1-4.8, 4a-d), wherein the transfer device (1, 1a-d) and the receiving units (4.1-4.8, 4a-d) are moveable in the same direction during the transfer of the transport goods (T), and wherein the transfer device (1, 1a-d) includes transfer compartments (12, 12a, 12b, 12d) for accommodating the transport goods (T).

2. The loading device (10, 10a-d) according to claim 1, wherein the transfer device (1, 1a-d) and the receiving units (4.1-4.8, 4a-d) are moveable in a synchronous fashion during the transfer of the transport goods (T).

3. The loading device (10, 10a-d) according to claim 1, wherein the loading device (10, 10a-d) features a conveying section (5, 5a, 5c) and a transfer section (6, 6a, 6c, 6d), which at least partially overlap one another.

4. The loading device (10, 10a-d) according to claim 3, wherein the conveyor device (2, 2a-d) is discontinuous or continuous in the transfer section (6, 6a, 6c, 6d).

5. The loading device (10, 10a-d) according to claim 3, wherein the conveying speed of the receiving units (4.1-4.8, 4a-d) in the transfer section (6, 6a, 6c, 6d) is adaptable to the conveying speed of the receiving units (4.1-4.8, 4a-d) in the conveying section (5, 5a, 5c).

6. The loading device (10, 10a-d) according to claim 1, wherein the transfer device (1, 1a-d) is configured to acquire the receiving units (4.1-4.8, 4a-d) from the conveyor device (2, 2a-d), to convey the receiving units synchronous with the transport goods (T) in the transfer device (1, 1a-d) and to load the receiving units with the transport goods (T), as well as to transfer the loaded receiving units (4.1-4.8, 4a-d) to the conveyor device (2, 2a-d).

7. The loading device (10, 10a-d) according to claim 1, wherein the receiving units (4.1-4.8, 4a-d) include a transport unit (41.1-41.8, 41a-d) and at least one bag (42.1-42.8, 42a-d) for accommodating the transport goods (T), which are permanently or releasably connected to one another, wherein the transport unit (41.1-41.8, 41a-d) is conveyed in the conveyor device (2, 2a-d) and/or the transfer device (1, 1a-d).

8. The loading device (10, 10a-d) according to claim 7, wherein the conveyor device is an overhead conveyor device (2, 2a-d) with a track rail (21, 21a-d), wherein a plurality of transport units are configured in the form of carriages (41.1-41.8, 41a-d) that are conveyable along the track rail (21, 21a-d) at variable distances from one another.

9. The loading device (10, 10a-d) according to claim 7, wherein the loading device (10, 10a-d) is configured to align the orientation of the at least one bag (42.1-42.8, 42a-d) before and/or during and/or after the transfer of the transport goods (T) to the at least one bag (42.1-42.8, 42a-d).

10. The loading device (10, 10a-d) according to claim 1, wherein the transfer device (1, 1a-d) includes engaging elements (11), which are capable of functional connection to the receiving units (4.1-4.8, 4a-d).

11. The loading device (10, 10a-d) according to claim 1, wherein the transfer compartments (12, 12a, 12b, 12d) include guiding elements (13.2, 13.2a, 13.2b) configured to guide the transport goods (T).

12. The loading device (10, 10a-d) according to claim 1, wherein the transfer compartments (12, 12a, 12b, 12d) include stopping elements (14, 14d), that are moveable between a closed position and an open position and that hold the transport goods (T) in a respective one of the transfer compartments (12, 12a, 12b, 12d) in the closed position, wherein the stopping elements (14, 14d) are controllable.

13. The loading device (10, 10a-d) according to claim 12, wherein the stopping elements (14, 14d) form in the open position a guide for acquisition of the transport goods (T) from the supply conveyor (3, 3a-d) and/or for transfer of the transport goods (T) to the receiving units (4.1-4.8, 4a-d).

14. The loading device (10, 10a-d) according to claim 12, wherein the stopping elements (14, 14d) are configured to open and/or hold open a receiving opening (43.1, 43.2, 43.3, 43a) of the receiving units (4.1-4.8, 4a-d) to be loaded during motion from the closed position into the open position.

15. The loading device (10, 10a-d) according to claim 1, wherein the transfer device is endlessly revolving and includes a wheel (1, 1a, 15.1b, 15.2b, 1c) for conveying the transport goods (T) and/or the receiving units (4.1-4.8, 4a-d).

16. The loading device (10, 10a-d) according to claim 1, wherein the loading device (10, 10a-d) includes opening devices (44a), which are configured to open and/or hold open a receiving opening (43.1, 43.2, 43.3, 43a) of the receiving units (4.1-4.8, 4a-d) to be loaded.

17. A conveyor system with a loading device (10, 10a-d) according to claim 1.

18. The conveyor system according to claim 17, wherein the conveyor system includes a control unit, which controls the transfer of the transport goods (T) to the receiving units (4.1-4.8, 4a-d).

19. A method for operating a loading device (10, 10a-d) for continuously loading receiving units (4.1-4.8, 4a-d) with transport goods (T), comprising the steps of:
providing a plurality of receiving units (4.1-4.8, 4a-d);
providing a conveyor device (2, 2a-d), in which the receiving units (4.1-4.8, 4a-d) are conveyed;
providing a supply conveyor (3, 3a-d) for supplying transport goods (T);
providing a transfer device (1, 1a-d) to acquire the transport goods (T) from the supply conveyor (3, 3a-d), as well as convey and transfer the transport goods to the receiving units (4.1-4.8, 4a-d), wherein the transfer device (1, 1a-d) and the receiving units (4.1-4.8, 4a-d) are moveable in the same direction during the transfer of the transport goods (T), and wherein the transfer device (1, 1a-d) includes transfer compartments (12, 12a, 12b, 12d) for accommodating the transport goods (T);
supplying the transport goods (T) with the supply conveyor (3, 3a-d);
acquiring, the transport goods (T) with the transfer device (1, 1a-d);
conveying the transport goods (T) in the transfer device (1, 1a-d);
supplying the receiving units (4.1-4.8, 4a-d) to be loaded by the conveyor device (2, 2a-d); and
transferring the transport goods (T) to the receiving units (4.1-4.8, 4a-d) while the transfer device (1, 1a-d) and the receiving units (4.1-4.8, 4 a-d) move in the same direction.

20. The method according to claim 19, wherein the transfer device (1, 1a-d) and the receiving units (4.1-4.8, 4a-d) moved in a synchronous fashion during the transfer of the transport goods (T) to the receiving units (4.1-4.8, 4a-d).

21. The method according to claim 19, wherein the transfer device (1, 1a-d) acquires the receiving units (4.1-4.8, 4a-d) to be loaded from the conveyor device (2, 2a-d), conveys the receiving units synchronous with the transport goods (T) in the transfer device (1, 1a-d), loads the receiving units with the transport goods (T) and transfers the loaded receiving units (4.1-4.8, 4a-d) to the conveyor device (2, 2a-d).

22. A loading device (10, 10a-d) for continuously loading receiving units (4.1-4.8, 4a-d) with transport goods (T) comprising:
a plurality of receiving units (4.1-4.8, 4a-d);
a conveyor device (2, 2a-d), in which the receiving units (4.1-4.8, 4a-d) are conveyed;
a supply conveyor (3, 3a-d) for supplying transport goods (T); and
a transfer device (1, 1a-d) to acquire the transport goods (T) from the supply conveyor (3, 3a-d), as well as convey and transfer the transport goods to the receiving units (4.1-4.8, 4a-d), wherein the transfer device (1, 1a-d) and the receiving units (4.1-4.8, 4a-d) are moveable in the same direction during the transfer of the transport goods (T), and wherein the transfer device (1, 1a-d) is configured to acquire the receiving units (4.1-4.8, 4a-d) from the conveyor device (2, 2a-d), to convey the receiving units synchronous with the transport goods (T) in the transfer device (1, 1*a-d*) and to load the receiving units with the transport goods (T), as well as to transfer the loaded receiving units (4.1-4.8, 4*a-d*) to the conveyor device (2, 2*a-d*).

23. A loading device (10, 10*a-d*) for continuously loading receiving units (4.1-4.8, 4*a-d*) with transport goods (T) comprising:
a plurality of receiving units (4.1-4.8, 4*a-d*);
a conveyor device (2, 2*a-d*), in which the receiving units (4.1-4.8, 4*a-d*) are conveyed;
a supply conveyor (3, 3*a-d*) for supplying transport goods (T); and
a transfer device (1, 1*a-d*) to acquire the transport goods (T) from the supply conveyor (3, 3*a-d*), as well as convey and transfer the transport goods to the receiving units (4.1-4.8, 4*a-d*), wherein the transfer device (1, 1*a-d*) and the receiving units (4.1-4.8, 4*a-d*) are moveable in the same direction during the transfer of the transport goods (T), and wherein the transfer device (1, 1*a-d*) includes engaging elements (11), which are functionally connected to the receiving units (4.1-4.8, 4*a-d*).

24. A loading device (10, 10*a-d*) for continuously loading receiving units (4.1-4.8, 4*a-d*) with transport goods (T) comprising:
a plurality of receiving units (4.1-4.8, 4*a-d*);
a conveyor device (2, 2*a-d*), in which the receiving units (4.1-4.8, 4*a-d*) are conveyed;
a supply conveyor (3, 3*a-d*) for supplying transport goods (T); and
a transfer device (1, 1*a-d*) to acquire the transport goods (T) from the supply conveyor (3, 3*a-d*), as well as convey and transfer the transport goods to the receiving units (4.1-4.8, 4*a-d*), wherein the transfer device (1, 1*a-d*) and the receiving units (4.1-4.8, 4*a-d*) are moveable in the same direction during the transfer of the transport goods (T), and wherein the transfer device is endlessly revolving and includes a wheel (1, 1*a*, 15.1*b*, 15.2*b*, 1*c*) for conveying the transport goods (T) and/or the receiving units (4.1-4.8, 4*a-d*).

25. A loading device (10, 10*a-d*) for continuously loading receiving units (4.1-4.8, 4*a-d*) with transport goods (T) comprising:
a plurality of receiving units (4.1-4.8, 4*a-d*);
a conveyor device (2, 2*a-d*), in which the receiving units (4.1-4.8, 4*a-d*) are conveyed;
a supply conveyor (3, 3*a-d*) for supplying transport goods (T); and
a transfer device (1, 1*a-d*) to acquire the transport goods (T) from the supply conveyor (3, 3*a-d*), as well as convey and transfer the transport goods to the receiving units (4.1-4.8, 4*a-d*), wherein the transfer device (1, 1*a-d*) and the receiving units (4.1-4.8, 4*a-d*) are moveable in the same direction during the transfer of the transport goods (T); and opening devices (44*a*), which are configured to open and/or hold open a receiving opening (43.1, 43.2, 43.3, 43*a*) of the receiving units (4.1-4.8, 4*a-d*) to be loaded.

26. A conveyor system comprising:
a loading device (10, 10*a-d*) for continuously loading receiving units (4.1-4.8, 4*a-d*) with transport goods (T) comprising:
a plurality of the receiving units (4.1-4.8, 4*a-d*);
a conveyor device (2, 2*a-d*), in which the receiving units 4.1-4.8, 4*a-d*) are conveyed;
a supply conveyor (3, 3*a-d*) for supplying the transport goods (T); and
a transfer device (1, 1*a-d*) to acquire the transport goods (T) from the supply conveyor (3, 3*a-d*), as well as convey and transfer the transport goods to the receiving units (4.1-4.8, 4*a-d*), wherein the transfer device (1, 1*a-d*) and the receiving units (4.1-4.8, 4*a-d*) are moveable in the same direction during the transfer of the transport goods (T); and
a control unit, which controls the transfer of the transport goods (T) to the receiving units (4.1-4.8, 4*a-d*).

27. A method for operating a loading device (10, 10*a-d*), for continuously loading receiving units (4.1-4.8, 4*a-d*) with transport goods (T), the method comprising the steps of:
providing a conveyor device (2, 2*a-d*), in which the receiving units (4.1-4.8, 4*a-d*) are conveyed;
providing a supply conveyor (3, 3*a-d*) for supplying transport goods (T);
providing a transfer device (1, 1*a-d*) to acquire the transport goods (T) from the supply conveyor (3, 3*a-d*), as well as convey and transfer the transport goods to the receiving units (4.1-4.8, 4*a-d*), wherein the transfer device (1, 1*a-d*) and the receiving units (4.1-4.8, 4*a-d*) are moveable in the same direction during the transfer of the transport goods (T);
supplying the transport goods (T) with the supply conveyor 3*a-d*);
acquiring the transport goods (T) with the transfer device (1, 1*a-d*);
conveying the transport goods (T) in the transfer device (1, 1*a-d*);
supplying the receiving units (4.1-4.8, 4*a-d*) to be loaded by the conveyor device (2, 2*a-d*); and
transferring the transport goods (T) to the receiving units (4.1-4.8, 4*a-d*) while the transfer device (1, 1*a-d*) and the receiving units (4.1-4.8, 4 *a-d*) move in the same direction, wherein the transfer device (1, 1*a-d*) acquires the receiving units (4.1-4.8, 4*a-d*) to be loaded from the conveyor device (2, 2*a-d*), conveys the receiving units synchronous with the transport goods (T) in the transfer device (1, 1*a-d*), loads the receiving units with the transport goods (T) and transfers the loaded receiving units (4.1-4.8, 4*a-d*) to the conveyor device (2, 2*a-d*).

* * * * *